(12) United States Patent
Claudatos et al.

(10) Patent No.: US 7,245,221 B2
(45) Date of Patent: Jul. 17, 2007

(54) INVENTORY CONTROL

(75) Inventors: Christopher Hercules Claudatos, San Jose, CA (US); William Dale Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 300 days.

(21) Appl. No.: 10/956,833

(22) Filed: Oct. 1, 2004

(65) Prior Publication Data

US 2006/0072787 A1 Apr. 6, 2006

(51) Int. Cl.
*G08B 13/14* (2006.01)
(52) U.S. Cl. .................. 340/572.1; 340/10.1; 705/22; 705/28
(58) Field of Classification Search ............. 340/572.1
See application file for complete search history.

(56) References Cited

U.S. PATENT DOCUMENTS

| | | | |
|---|---|---|---|
| 6,195,006 B1* | 2/2001 | Bowers et al. ........... | 340/572.1 |
| 6,598,791 B2* | 7/2003 | Bellis et al. ............. | 235/383 |
| 2002/0008621 A1* | 1/2002 | Barritz et al. ........... | 340/572.1 |
| 2002/0038267 A1* | 3/2002 | Can et al. ................ | 705/28 |
| 2003/0018897 A1* | 1/2003 | Bellis et al. ............. | 713/182 |
| 2005/0059367 A1* | 3/2005 | Kim ........................ | 455/138 |
| 2005/0086108 A1* | 4/2005 | Sakamoto et al. ........ | 705/14 |
| 2005/0258956 A1* | 11/2005 | Neuwirth ................ | 340/539.13 |
| 2005/0258964 A1* | 11/2005 | Hackstadt et al. ....... | 340/572.1 |
| 2005/0289032 A1* | 12/2005 | Hoblit .................... | 705/35 |

* cited by examiner

*Primary Examiner*—Benjamin C. Lee
*Assistant Examiner*—George A. Bugg
(74) *Attorney, Agent, or Firm*—Theodore A. Chen; Krishnendu Gupta

(57) ABSTRACT

A method, article of manufacture, and apparatus for inventory control of items in a location are disclosed. In an embodiment, this comprises a surveillance system comprising a plurality of cameras and at least one display, at least one identification tag, at least one identification tag reader configured to read the identification tag and placed to cover at least a portion of the location, and a computer configured to process information including the identification tag read by the reader. In response to the information, the computer controls a video camera to display an image showing an area around the identification tag. This may be based on a determination of heightened risk, such as when the identification tag is associated with a receipt and is brought back to the location after being removed from the location.

14 Claims, 4 Drawing Sheets

INVENTORY CONTROL

CROSS REFERENCE TO RELATED APPLICATIONS

This application is related to co-pending U.S. patent application Ser. No. 10/956,822 for METHOD AND SYSTEM FOR INVENTORY CONTROL and filed concurrently herewith, which is incorporated herein by reference for all purposes.

FIELD OF THE INVENTION

This invention relates generally to inventory control through use of identification tags such as radio frequency identification tags.

BACKGROUND

Inventory shrinkage is a significant issue for the retail industry, amounting to tens of billions of dollars in losses annually. A significant portion of these losses come from shoplifting, including theft of unpaid merchandise, fraudulent return of unpaid merchandise, and obtaining refunds for merchandise at a higher price than was originally paid. These points of loss may involve receipts, whether real or counterfeit.

To combat inventory shrinkage, stores have employed methods such as surveillance, electronic article surveillance (EAS), marking receipts as used, and having a separate secure area for returning merchandise. Another approach involves the use of radio frequency identification (RFID) tags on every item, with a unique identifier for each tag so that every item can be tracked. However, this requires that every item have an RFID tag, which results in added expense and requires changes in the manufacturing and/or packaging processes. These methods may be personnel-intensive, expensive, and/or not completely effective in preventing losses.

There is a need, therefore, for an improved method, article of manufacture, and apparatus for inventory control using identification tags such as RFID tags.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. A general purpose computer system such as an Intel-based processor running Microsoft Windows or Linux may be used, or a specialized appliance could be used. In this specification, these implementations, or any other form that the invention may take, may be referred to as techniques. In general, the order of the steps of disclosed processes may be altered within the scope of the invention.

An embodiment of the invention will be described with reference to an inventory control system in a retail environment, but it should be understood that the principles of the invention are not limited to inventory control in stores. Rather, they are applicable to any environment in which it is desirable to control the provision of services and tangible objects. They may be applied to control of inventory in a secured area, to ensure that inventory is not removed from the secured area unless authorized. Although the concepts herein are described with respect to the use of radio frequency identification (RFID) tags, it should be understood that they are not limited to an inventory control system. Other identification tag devices capable of automatically uniquely identifying themselves (or the objects to which they are attached) may be used, such as barcodes, magnetic tags, radio frequency transmitters/transponders, and ultrasonic transmitters/transponders. It is advantageous to use an automatic identification device that does not require line of sight between the device and scanner, for ease of use and reliability, but line-of-sight devices may be used in accordance with the full spirit and principles of the invention.

Figure 1:
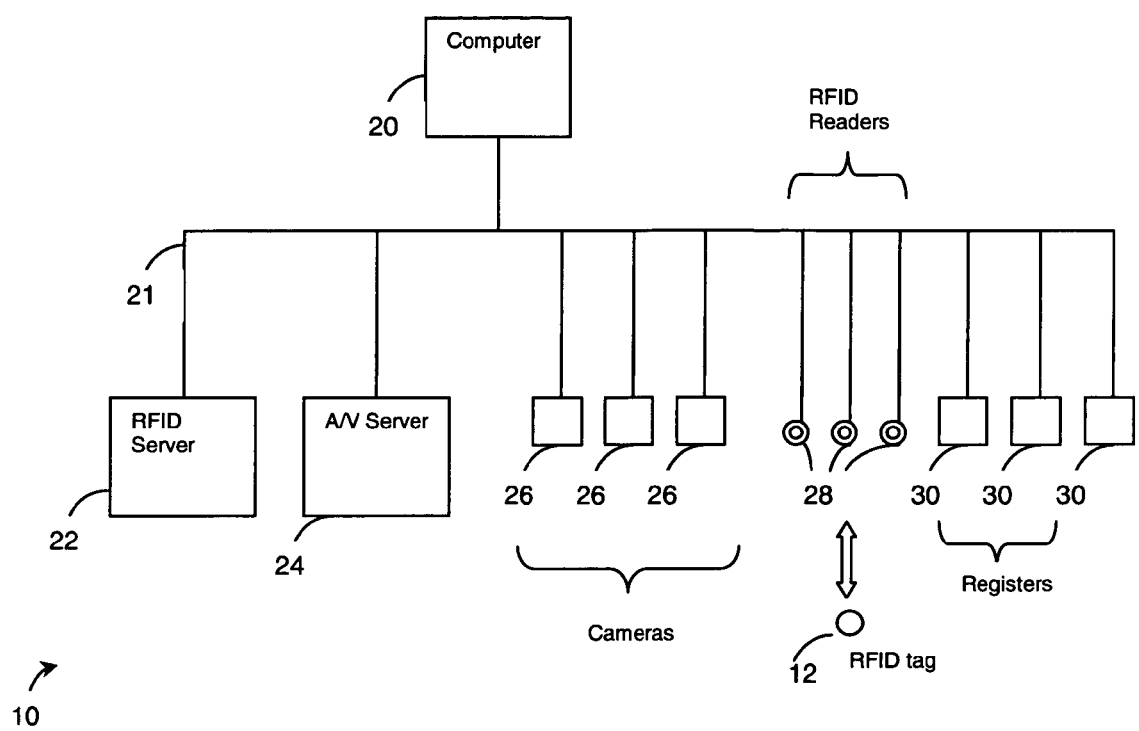
FIG. 1 is a diagram illustrating components of an inventory control system.

The principles of the invention may be used to secure the purchase of goods as well as services (such as restaurants, entertainment, etc.). An embodiment of an inventory control system 10 is shown in FIG. 1. It should be understood that although particular numbers of each element are used for illustrative purposes, any number may be used and the principles of the invention are not limited to any specific number of such elements. Purchase receipts are commonly used in connection with the provision of goods and services, and may be tagged with radio frequency identification (RFID) tags 12. Alternatively, an RFID tag 12 may itself be used as the receipt. At the time of the transaction, the RFID tag 12 is associated with the transaction, such as by scanning the RFID tag 12 with an RFID reader 28 and inputting its identification code into a computer 20 or RFID server 22 (which could be a computer as well), which associates the identification code with the transaction. By doing so, the RFID 12 and the association it provides between the purchased items and the bearer of the RFID tag/receipt may be used to prevent theft and fraud committed by exploiting the weaknesses of the current security practices and systems through the use of real and counterfeit purchase receipts. Typically, the items in inventory are located in a secured area in which it is desirable to keep those items until they are transferred (such as to a customer who has paid for them).

RFID readers 28 in the form of radio frequency receivers configured to receive signals from the RFID tags 12 may be disposed around the secured area, and at access points via which ingress or egress may occur. The RFID 12 may be an active transponder that contains a power source and transmits its signal using that power source, or a passive transponder that uses the energy of a transmitted signal from the RFID reader 28 (which could be a transceiver) to transmit its own signal. The RFID reader 28 may have a limited range and read the RFID tag 12 when the tag is in proximity to the reader. A video/audio server 24 and cameras 26 may be used if a surveillance system is linked to the inventory control system 10.

When the RFID reader 28 reads an identification code in the form of a signal from an RFID tag 12, the RFID reader 28 transmits information about the signal to a control center 20, which may be a computer configured to receive and track information about transactions, RFID tags, time, date, location, etc. and cause alarms, notifications, and actions to be taken in response. A record may be made that an RFID tag 12 was detected by a particular RFID reader 28 at a certain time and location. The computer 20 can store these and other events in a storage device. The location may be explicitly given by the RFID reader 28, or the location may be determined by knowledge of the placement of the reader 28. Similarly, the timestamp may be sent by the RFID reader 28, or determined by the computer 20 upon reception of the information from the RFID reader 28. To reduce storage requirements, the computer 20 may be configured to store only changes in state, or RFID server 22 may be configured to report only changes in state; i.e. instead of repeatedly entering information that a tag is being read by an RFID reader 28, a single report would be entered when the RFID reader 28 detects the RFID tag 12, and another report would be entered when the RFID reader 28 no longer detects the RFID tag 12.

A network 21 may be used to allow the control center to communicate with various RFID readers, alarms, and so on. The network 21 may be hardwired or wireless, and the computer may comprise a network interface card to permit it to communicate over the network 21. This network 21 could be, for example, a local area network or wide area network. The computer 20 also has a storage system to store data relating to RFID tags 12 detected, transactions made, actions taken, and other information. Receipts may be provided with RFID tags 12 already attached or incorporated in them such as by embedding the RFID tag 12 between layers, or a device for affixing an RFID tag 12 to a receipt. In this case, the RFID 12 could be incorporated into a "smart label" that has a layer of face stock and an adhesive layer, with the RFID tag 12 embedded in between the layers. Attachment of the RFID tag 12 to the receipt may also be done manually.

The association of the RFID tagged receipt to the purchased items creates a means of preventing theft or fraud that can occur with RFID systems that do not associate the purchased items with the bearer of the RFID tag/receipt, as will be discussed herein.

In one common approach, a shoplifter may obtain a sales receipt by making an actual purchase, finding or stealing a real receipt, or counterfeiting a receipt, and use the receipt in order to steal additional merchandise or obtain cash. One method of exploiting weaknesses and gaps in the system ("exploit") is for the shoplifter to produce a counterfeit or cloned receipt, enter the store, pick up the item(s) listed on the receipt, and take them to the customer service/returns cashier in order to fraudulently obtain a refund.

In another method, the counterfeiter enters the store with the counterfeit receipt, picks up the items listed on the receipt and leaves the store with the goods. Even with a guard marking "used" receipts at the door, the counterfeiter would be able to exit unchallenged because the counterfeit receipt is unmarked. Another method involves creating a receipt showing the purchase price of an item at the regular selling price. When the store runs a sale and discounts the price of the item, the counterfeiter returns to the store and claims a refund of the difference in price between the "purchase price" and the then-discounted price.

The shoplifter may also use a real receipt, obtained by either making a legitimate purchase or obtaining a legitimate receipt from the trash or buying/stealing one from other customers. Using the real receipt, the shoplifter returns to the store, gathers the items listed on the receipt, and walks out of the store without paying. This exploit is possible in stores that do not mark the receipt as "used". In stores that do mark receipts as "used", the shoplifter would not leave the store but take the merchandise to the returns/customer service counter and fraudulently claim a refund.

The inventory control system 10 using RFID-tagged receipts as described herein would know, even if the tagged receipt were discarded by a customer, that the receipt/tag had been taken out of the building. The inventory control system 10 could detect reentry of the receipt into the store, and provide notification to store personnel. This would be the case even if the shoplifter secretly brings the "real" tag/receipt into the store. The system 10 would know that the original purchaser has left the facility and when the shoplifter takes some goods and presents them with the receipt to the cashier for a refund, the system 10 will know that it did not detect reentry of the tag/receipt into the facility, and could notify store personnel.

In case of a legitimate return, the customer will bring back the goods and the receipt. If he returns with the tag/receipt the system 10 will inform store personnel who can then direct the customer and verify the customer's claims. The control center 20, if implemented in a computer, may have a screen to display messages to store personnel, an audio output to notify store personnel, or other means of communicating information to users.

Surveillance may also be used to combat shoplifting. This approach requires a live and/or recorded (e.g. video-taped) surveillance of the store and its customers. The purpose is to provide a means of surveillance for security personnel, and to secure evidence against shoplifters. This method is often inadequate for securing evidence due to poor quality video and audio and suffers from at least two additional shortcomings: 1) the method is costly since it requires trained and attentive personnel to monitor the activities of each customer, and 2) the method is highly inaccurate since the shoplifters are adept at avoiding detection and the monitoring personnel may frequently not notice criminal activity. In some cases shoplifters may employ multiple partners and attempt to create diversions away from the prime criminal act Another approach involves marking receipts as used. This requires the store to post security personnel at every exit of the store. In addition to other security duties, these personnel inspect every receipt of every customer leaving the premises and then mark each receipt with a marking device usually a pen or ink-marker. This method suffers from several problems: (1) The security personnel may not mark every receipt. When the store is busy or the customer is not compliant, the security personnel may not check and mark the receipt either through carelessness or intimidation. Alternatively, the shoplifter may present a counterfeit receipt for marking and leave the true receipt unmarked; (2) Even if a receipt is marked, that does not prevent the shoplifter from re-entering the store, gathering new merchandise from the store shelves, and returning the un-purchased merchandise to the returns desk for a fraudulent refund; (3) Shoplifters sometimes work with collaborators who are employees of the targeted victim and work as security, customer service, or cashier personnel. As collaborators, they work as accomplices to the theft and subvert the security measures put in place by their employer. As such, they may collaborate with the shoplifter and not mark the receipt.

Separate secure areas may be used for returns, making use of physical security. Often, the customer service/returns cashiers are in the same areas as the normal cashiers. This makes it easier for a shoplifter to return to the store with a "used" receipt and return un-purchased items for a refund. The returns cashier may be located in such a way as to make it difficult, if not impossible, for customers who have entered the store for legitimate first-time purchases to enter the returns area unnoticed. One method is to have the returns-customers enter the returns-cashier area directly from the outside and not commingle returns traffic with purchase traffic.

This method may be effective at reducing the marked receipt returned goods exploit because it makes it difficult, if not impossible, for a shoplifter to gather goods and take them to the returns-cashier without first exiting the store and going through the usual security systems. Its main failure is that it only minimizes false returns but does nothing to prevent shoplifters from stealing goods (leaving the premises with unpaid goods). It is also ineffective in stopping shoplifters who use counterfeit receipts from obtaining refunds for the difference between the "purchase price" and the then-discounted price.

Establishments that provide services are also vulnerable to these exploits in similar manner. For example, a restaurant is vulnerable to counterfeit receipts. A shoplifter can order and eat a meal and then present to the cashier a fraudulent receipt that reflects a much less costly purchase.

The key enabling element in each of these exploits is the vulnerability created by the receipt itself. As described herein, some methods have been employed to combat the problem, but they each have sufficient weaknesses to make them vulnerable to exploit. One approach is to "serialize" each receipt with a serial number and/or barcode. This method does not prevent false returns, and unless combined with physical marking or barcode scanning, does not prevent the shoplifter from re-entering the store and leaving with a duplicate set of the items originally purchased. To prevent this exploit, the receipt's barcode or serial number would need to be scanned or checked upon exit with a barcode scanner which in most cases is not done, as it requires a person to inspect and scan receipts at each exit/entrance.

A solution to these exploits is the use of an RFID tag 12 on every receipt or making the RFID tag 12 itself the receipt. By tagging each receipt with an RFID tag 12 or by making the RFID tag 12 the receipt itself, the business has a means of authenticating every receipt and also has the ability to collect complete purchase-lifecycle information that can be associated with every element of the purchase such as the purchaser/customer, the items purchased, the location, date, time, cashier, exit/entry location, etc., and the receipt itself. This can be done automatically, without requiring personnel to inspect and scan receipts at each exit/entrance, which slows customers and may upset them. This information may be stored by the control system 20.

Figure 2:
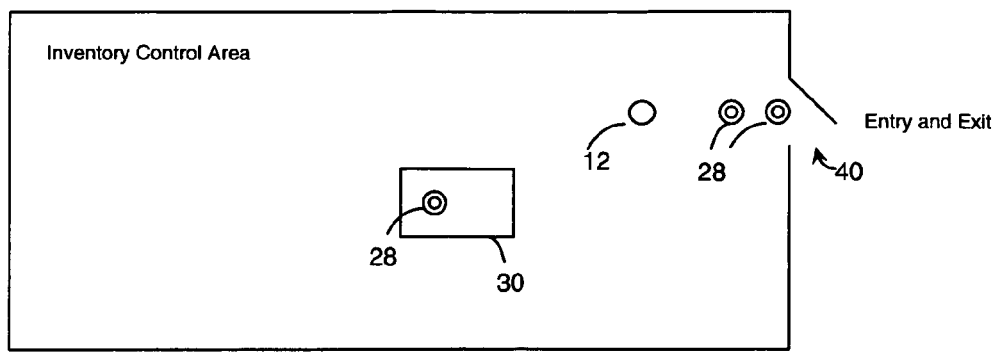
FIG. 2 is a flowchart illustrating an inventory control system embodiment.
Figure 3:
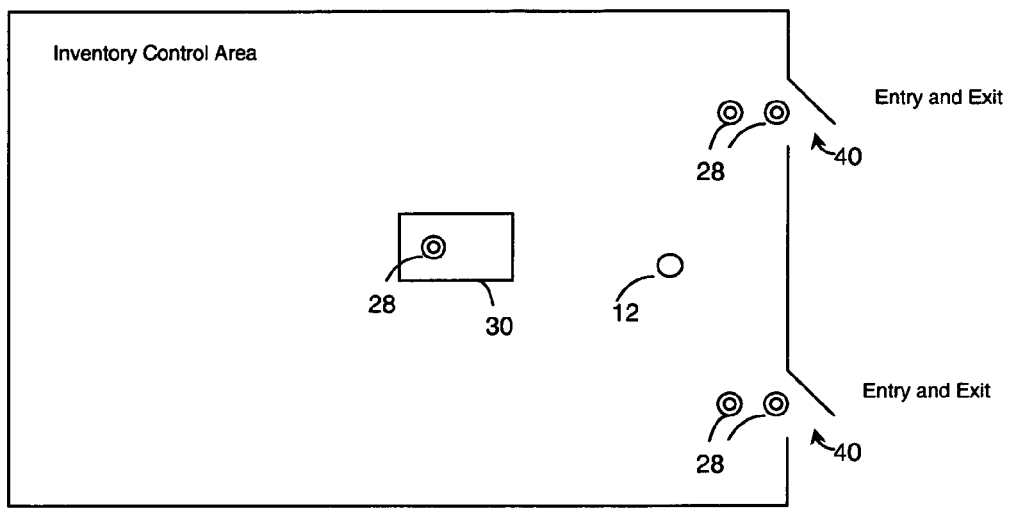
FIG. 3 is a flowchart illustrating an inventory control system embodiment.

In an embodiment, every receipt issued is tagged with an RFID tag 12, or the RFID tag 12 is the receipt itself. FIGS. 2 and 3 show embodiments of an inventory control system implementation. Every entry and exit 40 to the store may be equipped with an RFID tag reader 28 (or several), and merchandise might not necessarily be tagged with RFID tags 12. It should be understood that although this and other figures may depict a particular number of RFID tag readers 28, any number may be used depending on factors such as desired coverage. This would achieve the lowest cost deployment of RFID, because RFID tags 12 are applied only to the receipts and not to the merchandise. This provides a means of authenticating the receipt and identifying when used receipts re-enter the store, alerting the store personnel of the potential for theft. Further, in some deployments and proposed deployments of RFID for EAS (Electronic Article Surveillance), the RFID tag is deactivated or "killed" upon the item's purchase by the consumer, possibly due to privacy concerns. In this case, the deactivated tag is no longer capable of identifying the article to which it is attached.

Upon purchase and at the time of payment, the cashier's station 30, which may be equipped with an RFID reader 28, registers which items are paid for by reading the barcodes of the items or entering the item's identifier into the register 30. The item's identifier may indicate the type of item and/or the specific instance of that item. Upon completion of payment, the cashier issues a purchase receipt which is tagged with an RFID tag 12. This information may be communicated to control center 20 by the register 30 and the RFID reader 28, or the register 30 may transmit the purchase information along with information from RFID reader 28. The tagged purchase receipt is associated with every element of the transaction such as the location or station ID of the cashier, the time and date, the individual items purchased and possibly the individual article's serial numbers and/or barcodes, the form of payment, the specific payment instrument, and so on.

When the customer leaves the premises, an RFID reader 28 at the exit registers the presence of the purchase receipt and records the transaction as complete. The customer has taken the goods and left the premises (i.e. taken "title" and full risk of loss). Several RFID readers 28 may be employed, for redundancy, coverage, and/or the ability to detect the location and/or direction of movement of the RFID tag 12 (i.e. placed so that it can be inferred from the order of detection by the RFID readers 28 whether the RFID tag 12 is entering or leaving). Other methods may be used to determine the location and/or direction of movement, such as triangulation of signals from the RFID tag 12, light beams to detect the person carrying the tag, microwave sensors, etc.

Figure 6:
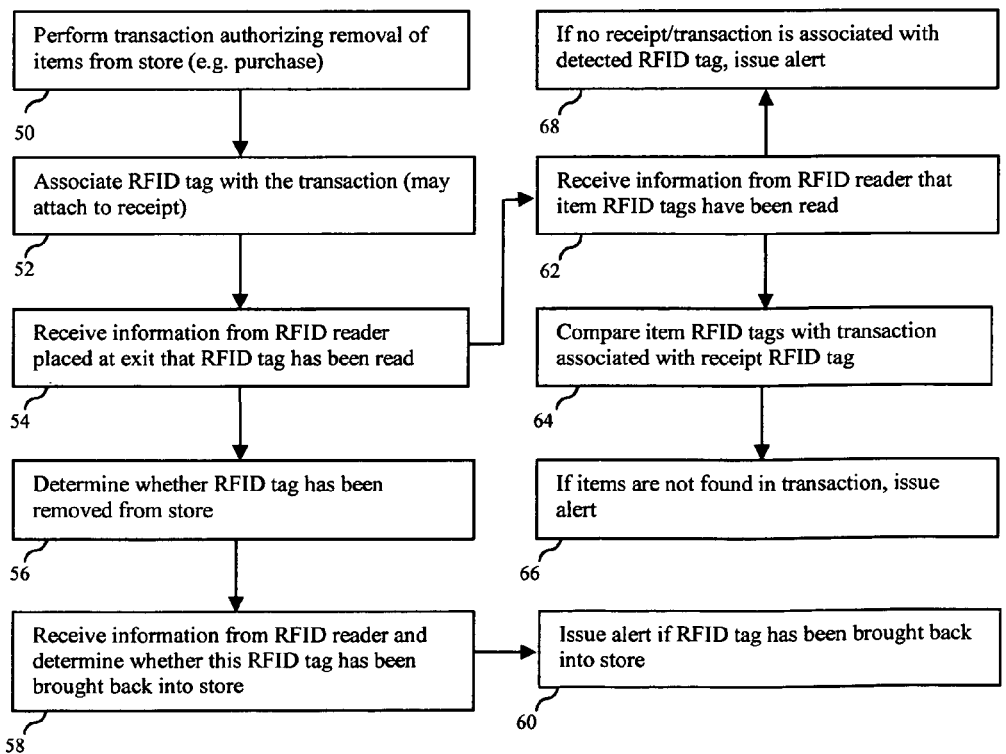
FIG. 6 is a flowchart illustrating the operation of the inventory control system.

The process is illustrated in FIG. 6. A transaction authorizing removal of items from the store (e.g. purchase) is performed in step 50. In step 52, an RFID tag 12 is associated with the transaction (it may be attached to the receipt, be incorporated into the receipt, or be the receipt itself). The computer 20 (or RFID server 22, which in turn communicates with computer 20) receives information from RFID reader 28 placed at exit 40 that the RFID tag 12 has been read, step 54. The computer 20 determines whether the RFID tag 12 has been removed from the store, step 56, such as by comparing timestamps of RFID reads reported by adjacent RFID readers 28. RFID tags 12 are read and reported to computer 20, and if the system 10 determines that an RFID tag 12 has been brought back into the store (i.e. it was already recorded as having left the store), step 58, an alert is issued in step 60. Such information may be recorded in a storage device by computer 20.

Because the system 10 is fully automated, no personnel (trained or otherwise) are required to monitor any customers. This lowers the operating cost for the operator of the inventory control system 10. Because the system 10 is able to gather all relevant purchase transaction data and make the correct and necessary associations, attempts at fraud and theft are stopped.

Figure 4:
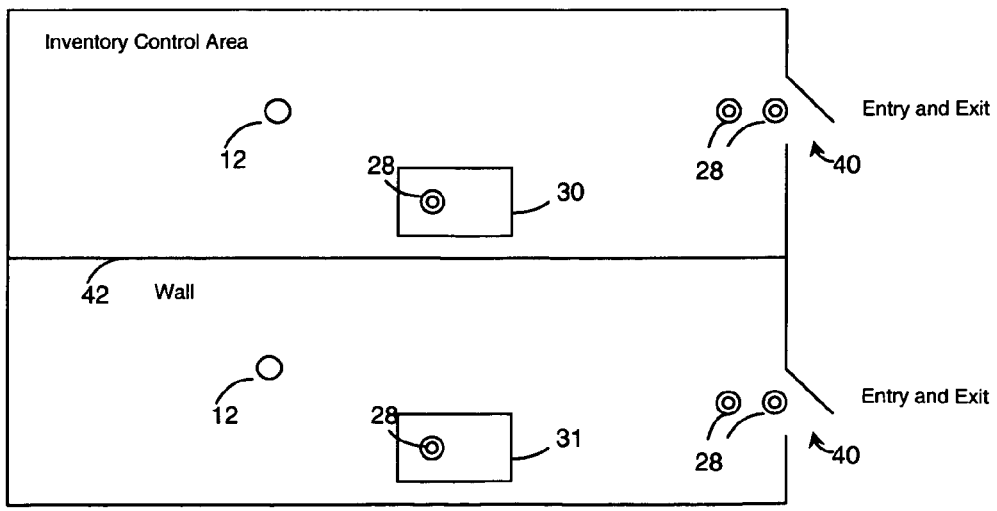
FIG. 4 is a flowchart illustrating an inventory control system embodiment.

People who re-enter the store with the tagged receipt, such as in an effort to leave with duplicate goods, can be detected upon entry. The system 10 would detect when tagged receipts enter the store, indicating higher risk. Upon entry of such a receipt the system 10 can notify security personnel (using conventional computer output devices such as a display, for example), and the customer may be directed to the appropriate customer service desk (unless, of course, the person attempting to return is there to steal). If a person returns to the store with the tagged receipt and without the goods in order to obtain a non-return, price adjustment refund (based on a price guarantee) the system 10 would detect the entry of the tagged receipt and alert the store personnel. The inventory control system 10 could also be in communication with an automated access control system for controlling ingress and egress, such as one that employs computer-controlled gates. If combined with entry points which are physically different for purchase and returns customers, the system 10 could detect and prevent returns customers from entering through the wrong entry point. FIG. 4 shows an embodiment of the inventory control system 10 in a configuration utilizing separate purchase and returns/customer service areas, divided by a wall 42. The cashier's register 30 is segregated from the returns register 31.

Figure 5:
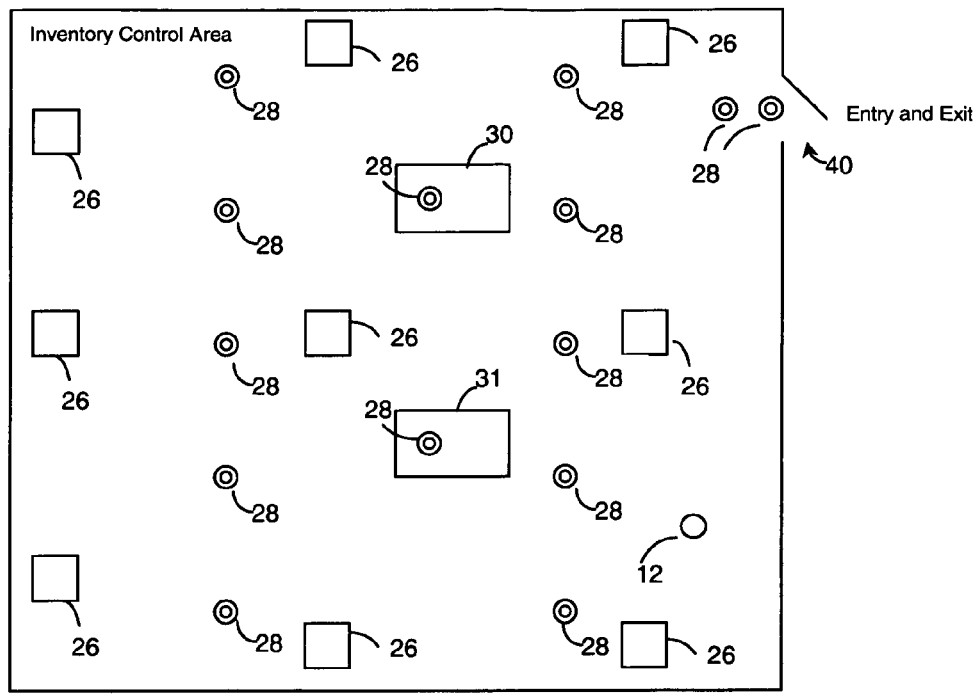
FIG. 5 is a flowchart illustrating an inventory control system embodiment.
Figure 7:
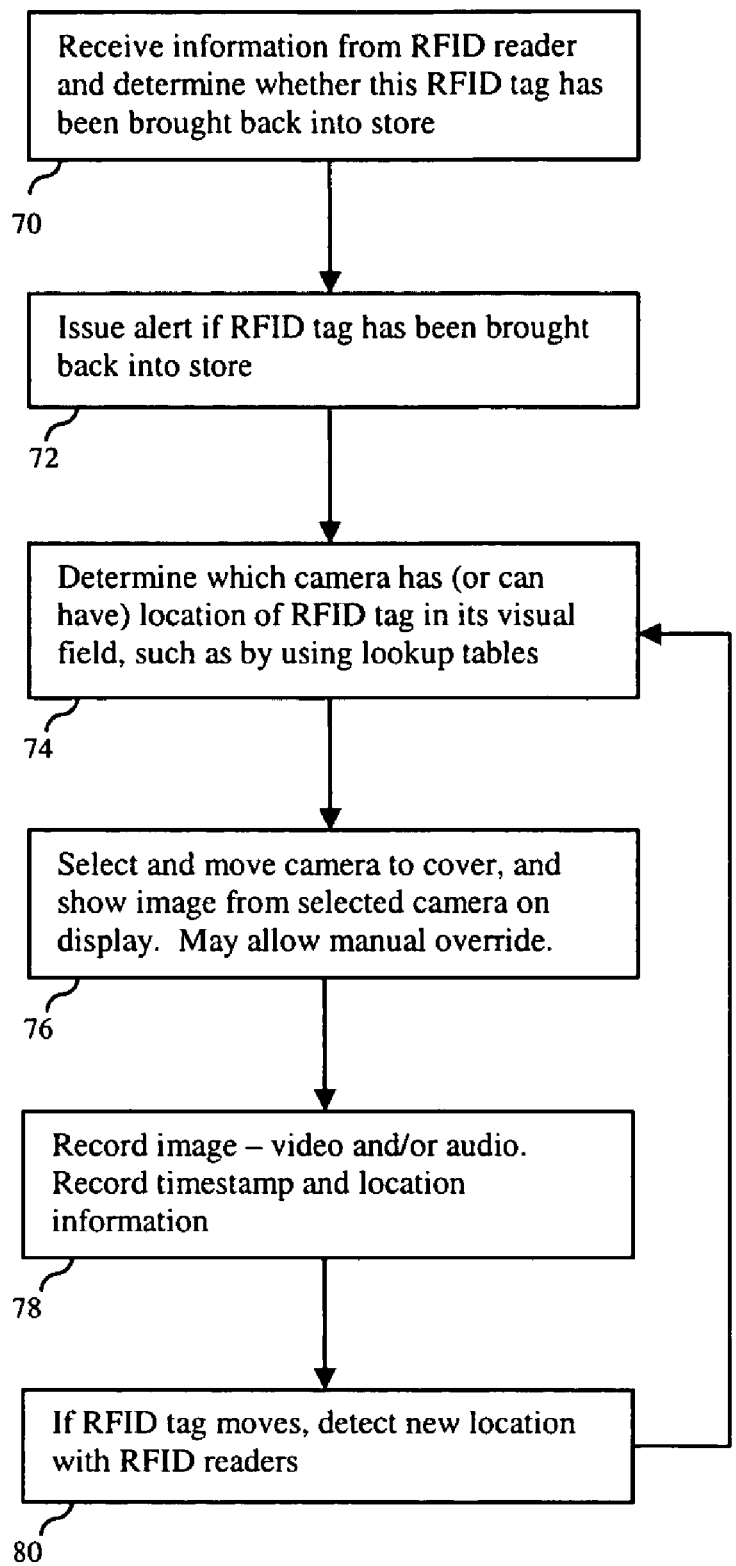
FIG. 7 is a flowchart illustrating the operation of the inventory control system in conjunction with a surveillance system.

The inventory control system 10 could also be used to identify persons for heightened surveillance. FIG. 5 illustrates an embodiment. For example, existing surveillance systems may incorporate a number of video cameras trained on particular locations within the store, a plurality of displays to show the images produced by the video cameras, and speakers to reproduce sounds picked up by microphones on the cameras. These cameras may be configured to pan, zoom, and tilt automatically at regular intervals, or be remotely controlled by an operator who wishes to focus on a particular area. Most of the time, however, the images displayed are of little interest to security personnel, who must continually watch the images from multiple cameras and attempt to spot suspicious activity. The inventory control system 10 could notify security personnel of heightened-risk persons entering the premises. This is shown in FIG. 7 as steps 70 and 72. The security personnel could acquire a visual image of a heightened-risk person through a camera 26 trained on the store entrance corresponding to the RFID scanner 28 that sensed the RFID tag 12 carried by the heightened-risk person, and thereafter observe that person on the various cameras in the store.

By placing RFID readers 28 at various locations on the premises, the inventory control system 10 could assist in tracking the heightened-risk person, such as by placing an identifying cursor on the video image(s) or automatically switching images to show the heightened-risk person. This may be done, for example, by creating a lookup table of associations between RFID readers 28 and cameras 26 that have them in their field of view or can be moved to have them in their field of view. Step 74. The lookup table may comprise information about camera movement to cover a desired location, and the system 10 could automatically operate a camera 26 to cover that desired location, with manual override possible through conventional means such as dials, joysticks, and switches. The image from the selected camera(s) is displayed on the monitor(s), step 76. If the inventory control system 10 is equipped with the ability to determine direction of movement of an RFID tag 12, another video display could be used to cover the predicted path of the heightened-risk person. As shown in step 78, video and/or audio recording of the image(s) may be activated by the inventory control system 10, which would track the person's movements, transactions, and actions. Timestamps and location information for the detected RFID tag 12 can be recorded, either as metadata for the recordings or in data storage separate from the recordings and used to index into the recordings. If the RFID tag 12 moves into range of another RFID reader 28, step 80, another camera 26 may be selected to cover the new position. With multiple displays, it is possible for the inventory control system 10 to track multiple heightened-risk persons. This allows security personnel to pay more attention to higher risk customers.

If every item available for purchase is tagged with an RFID tag 12, receipts may still be tagged with RFID tags 12 or RFID tags 12 provided as receipts. Every entry and exit 40 to the store may be equipped with one or more RFID tag readers 28. Upon purchase and at the time of payment, the cashier's station 30 may register which items are paid for by reading the RFID tags 12 of the items. Upon completion of payment, the cashier issues a purchase receipt that is also tagged with an RFID tag 12. The tagged purchase receipt is associated with every element of the transaction such as the location or station ID of the cashier, the time and date, the individual items purchased and possibly their individual serial numbers and/or RFID tags, the form of payment, the specific payment instrument, and so on.

When the customer leaves the premises, the RFID reader 28 at the exit 40 registers the presence of the purchase receipt as well as the items, shown as steps 54 and 62 in FIG. 6. In an embodiment, the inventory control system 10 may resolve the purchase receipt RFID tag 12 to each of the items transported by the customer through the exit 40, step 64. If there is an anomaly, such as a mismatch between the items transported by the customer and the items associated with the purchase receipt's transaction, an alarm or other notification takes place, step 66, and the customer's packages may be inspected for unpaid merchandise. Also, if goods are detected by the RFID reader 28 by sensing their item RFID tags, and there is no associated purchase receipt (with RFID tag 12), then an alarm may be generated and further inspection performed. This is shown as step 68 in FIG. 6.

This prevents shoplifters from stealing paid-for goods from the cashier's station 30 and exiting. In this exploit, the shoplifter is in line to pay for a purchase. As the shoplifter bags his/her goods s/he covertly grabs goods that have been paid for by other customers in line and puts them in his/her bag. The use of item-level serial number RFID tagging of goods alone is insufficient to prevent this exploit, because the system only knows that the goods have been paid for and cannot associate the goods with the person leaving the store. The inventory control system 10 described herein can associate the goods with the tagged receipt and determine whether the tag/receipt leaving the store is associated with the correct goods. If not, security personnel and/or systems can be notified. In every case, unauthorized removal of goods and/or services, whether accidental or intentional, is prevented.

Thus, the inventory control system 10 may be provided with the ability to associate the person with the goods purchased. As the cost of RFID tagging drops, its use may become more widespread at the item level, but even with item level tagging there is no way to associate the goods with the customer unless the customer is also tagged. The inventory control system 10 described herein creates a per-transaction association between the goods and the receipt. This is superior to customer-tagging because a tagged customer can perform the unmarked receipt exploit unless all the items also contain tags. The inventory control system 10 may combine receipt-tagging with customer-tagging.

People who reenter the store with the tagged receipt in an effort to leave with duplicate goods can be detected upon entry. The inventory control system 10 would detect when tagged receipts enter the store without the associated goods that have been previously purchased. Upon entry of such a receipt the system 10 can notify security personnel, and the customer may be directed to the appropriate customer service desk (unless, of course, the person attempting to return is there to steal). If a person returns to the store with the tagged receipt and without the goods in order to obtain a non-return, price adjustment refund (based on a price guarantee) the system 10 would detect the entry of the tagged receipt without the associated goods and alert the store personnel and/or systems (such as automated systems for controlling ingress and egress). If combined with entry points which are physically different for purchase and returns customers, the system 10 can detect and prevent returns customers entering through the wrong entry point. As described herein, any of these customers may be considered higher risk and selected for heightened observation by surveillance systems.

Although the methods and systems herein have been described with respect to an illustrative embodiment, it should be appreciated that the methods and systems disclosed are independent of the precise architecture of the inventory control system. The principles are equally applicable to service environments, such as restaurants, or any situation in which it is desirable to control movement of items from a particular area.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A system for inventory control of items stored at a location, comprising:
    a surveillance system comprising a plurality of cameras, a recorder for storing video or audio information from at least one camera, and at least one display;
    at least one identification tag;
    at least one identification tag reader configured to read the identification tag and placed at an egress to the location;
    a computer configured to process information including the identification tag read by the reader and in response to the information:
        select one of the plurality of video cameras to display an image showing an area around the identification tag, using data representing associations between readers and cameras operable to view areas around the readers;
        determine if the identification tag has been removed from the location;
        determine if the identification tag has been returned to the location by using the reader to detect the identification tag after the identification tag has been determined to have been removed from the location; and
        store the information, wherein the information includes the identity of the reader, at least a portion of information contained by the identification tag, and a timestamp.

2. The system as recited in claim 1, wherein the identification tag is associated with a transaction authorizing some items to be removed from the location.

3. The system as recited in claim 2, wherein the identification tag includes a radio frequency identification tag.

4. The system as recited in claim 1, wherein the computer is configured to issue an alert when the identification tag has been returned to the location.

5. The system as recited in claim 1, wherein the cameras are operable to pan, tilt, or zoom, the data includes pan, tilt, or zoom information for a camera to view an area around a reader, and the computer is configured to control a selected camera to pan, tilt, or zoom to view the area around the reader.

6. The system as recited in claim 5, wherein the surveillance system comprises an override operable to allow manual control of tilt, pan, or zoom of the selected camera.

7. The system as recited in claim 1, wherein the information further includes data associating the identification tag read with a portion of a database or index to a database where information regarding the associated event is stored.

8. The system as recited in claim 7, wherein the information further includes data associating the identification tag read with a portion of the recording where the image is stored.

9. The system as recited in claim 1, wherein the computer is configured to select an additional camera for viewing an area around an additional reader, when the additional reader detects the identification tag.

10. The system as recited in claim 9, wherein the computer is further configured to control the surveillance system to show an image from the additional camera on a display.

11. The system as recited in claim 9, wherein the computer is configured to deselect the camera when the reader no longer detects the identification tag.

12. A method of controlling inventory of items stored at a location using at least one identification tag reader and a surveillance system including a plurality of cameras and at least one display, the method comprising:

using the identification tag reader to detect an identification tag;

selecting a camera to view an area around the identification tag;

determining risk associated with the identification tag based on whether the identification tag has previously been removed from the location and whether the identification tag is being returned to the location;

determining, based on risk associated with the identification tag, whether to select the camera to view the area around the identification tag; and displaying an image from the camera on the display.

13. The method as recited in claim 12, wherein the identification tag includes a radio frequency identification tag.

14. A computer program product for controlling inventory of items stored at a location using at least one identification tag reader and a surveillance system including a plurality of cameras and at least one display, the computer program product comprising a computer usable medium having machine readable code embodied therein for:

using the identification tag reader to detect an identification tag;

selecting a camera to view an area around the identification tag;

determining risk associated with the identification tag based on whether the identification tag has previously been removed from the location and whether the identification tag is being returned to the location;

determining, based on risk associated with the identification tag, whether to select the camera to view the area around the identification tag; and displaying an image from the camera on the display.

* * * * *